United States Patent
Kamiya

(10) Patent No.: US 10,520,375 B2
(45) Date of Patent: Dec. 31, 2019

(54) FORCE DETECTION APPARATUS AND ROBOT

(71) Applicant: Seiko Epson Corporation, Tokyo (JP)

(72) Inventor: Toshiyuki Kamiya, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/964,709

(22) Filed: Apr. 27, 2018

(65) Prior Publication Data

US 2018/0313705 A1 Nov. 1, 2018

(30) Foreign Application Priority Data

Apr. 28, 2017 (JP) ................................. 2017-089385

(51) Int. Cl.

| G01L 1/16 | (2006.01) |
| B25J 13/08 | (2006.01) |
| B25J 18/04 | (2006.01) |
| G01L 1/14 | (2006.01) |
| G01L 5/00 | (2006.01) |
| B25J 19/02 | (2006.01) |

(52) U.S. Cl.
CPC ............... *G01L 1/16* (2013.01); *B25J 13/085* (2013.01); *B25J 18/04* (2013.01); *B25J 19/028* (2013.01); *G01L 1/144* (2013.01); *G01L 5/009* (2013.01); *G01L 5/0076* (2013.01); *G01L 5/167* (2013.01)

(58) Field of Classification Search
CPC ................................. G01L 1/16; G01L 5/009
See application file for complete search history.

(56) References Cited

U.S. PATENT DOCUMENTS

| 5,821,432 A | 10/1998 | Sidler et al. | |
| 8,726,740 B1* | 5/2014 | Mekid | B23Q 17/0966 |
| | | | 73/862.041 |
| 9,144,908 B2* | 9/2015 | Saen | B25J 13/083 |
| 9,459,136 B2* | 10/2016 | Sato | B25J 13/085 |
| 9,481,089 B2* | 11/2016 | Matsuzawa | B25J 9/1694 |
| 9,651,433 B2* | 5/2017 | Matsuzawa | G01L 1/16 |
| 2013/0233089 A1 | 9/2013 | Kawai et al. | |
| 2014/0366646 A1 | 12/2014 | Matsuzawa et al. | |
| 2015/0127159 A1* | 5/2015 | Kamiya | G01P 15/18 |
| | | | 700/258 |
| 2016/0243705 A1* | 8/2016 | Naitou | B25J 13/085 |
| 2018/0313704 A1* | 11/2018 | Yamamura | G01L 1/16 |
| 2018/0313705 A1* | 11/2018 | Kamiya | B25J 13/085 |

FOREIGN PATENT DOCUMENTS

| JP | 10-068665 A | 3/1998 |
| JP | 2013-186030 A | 9/2013 |
| JP | 2015-001384 A | 1/2015 |
| JP | 2015-090295 A | 5/2015 |
| JP | 2015-090296 A | 5/2015 |

* cited by examiner

*Primary Examiner* — Jamel E Williams
(74) *Attorney, Agent, or Firm* — Harness, Dickey & Pierce, P.L.C.

(57) ABSTRACT

A force detection apparatus includes a plurality of piezoelectric sensor parts placed around a first axis, and two fastening portions provided in correspondence with the piezoelectric sensor parts and applying precompression to the corresponding piezoelectric sensor part, wherein the two fastening portions are placed so that the piezoelectric sensor part may be located between the portions along a direction of the first axis. Further, four of the piezoelectric sensor parts are provided around the first axis. Furthermore, the plurality of piezoelectric sensor parts has a plurality of piezoelectric substrates.

11 Claims, 14 Drawing Sheets

FORCE DETECTION APPARATUS AND ROBOT

BACKGROUND

1. Technical Field

The present invention relates to a force detection apparatus and a robot.

2. Related Art

For example, as a force detection apparatus that detects a force applied thereto, a force detection apparatus described in Patent Document 1 (JP-A-10-68665) is known. The force detection apparatus described in Patent Document 1 has an attachment plate, an attachment block, a measurement cell sandwiched between the plate and the block, and two preload screws that apply preloads to the measurement cell through the attachment plate and the attachment block. Further, in the force detection apparatus described in Patent Document 1, the two preload screws are arranged in the width direction of the apparatus side by side for reduction of the height of the apparatus.

However, in the force detection apparatus, the preload screws are arranged in the width direction of the apparatus side by side, and it is difficult to reduce the width of the apparatus.

SUMMARY

An advantage of some aspects of the invention is to provide a force detection apparatus that may have a smaller width and a robot.

The advantage can be achieved by the following configurations.

A force detection apparatus according to an aspect of the invention includes a plurality of piezoelectric sensor parts placed around a first axis, and two fastening portions provided in correspondence with each of the piezoelectric sensor parts and applying precompression to the corresponding piezoelectric sensor part, wherein the two fastening portions are placed so that the piezoelectric sensor part maybe located between the portions along a direction of the first axis.

With this configuration, the force detection apparatus having a smaller width (a length in the direction orthogonal to the first axis) than that of related art is obtained.

A force detection apparatus according to an aspect of the invention includes a plurality of piezoelectric sensor parts placed around a first axis, and two fastening portions provided in correspondence with each of the piezoelectric sensor parts and applying precompression to the corresponding piezoelectric sensor part, wherein the two fastening portions are placed so that the piezoelectric sensor part maybe located between the portions along a direction of a third axis respectively tilted relative to the first axis and a second axis orthogonal to the first axis.

With this configuration, the force detection apparatus having a smaller width (a length in the direction orthogonal to the first axis) than that of related art is obtained.

In the force detection apparatus according to the aspect of the invention, it is preferable that four of the piezoelectric sensor parts are provided around the first axis.

With this configuration, the force applied to the force detection apparatus may be accurately detected based on output from the respective piezoelectric sensor parts. Further, the proper number of piezoelectric sensor parts may be placed and upsizing of the apparatus may be suppressed.

In the force detection apparatus according to the aspect of the invention, it is preferable that each of the plurality of piezoelectric sensor parts has a plurality of piezoelectric substrates.

With this configuration, the force detection apparatus may detect forces in different axis directions.

In the force detection apparatus according to the aspect of the invention, it is preferable that the plurality of piezoelectric substrates are stacked in the direction crossing the first axis.

With this configuration, for example, compared to the case where the plurality of piezoelectric substrates are stacked in a direction along the first axis, the size, particularly, the height of the force detection apparatus may be made smaller.

In the force detection apparatus according to the aspect of the invention, it is preferable that the plurality of piezoelectric substrates include a Y cut quartz crystal plate.

With this configuration, the applied force may be detected more reliably.

A force detection apparatus according to an aspect of the invention includes a first base part connectable to a first member, a second base part connectable to a second member, a piezoelectric sensor part placed between the first base part and the second base part, and two fastening portions apply precompression to the piezoelectric sensor part, wherein the two fastening portions are placed so that the piezoelectric sensor part may be located between the portions along a direction in which the first base part and the second base part are arranged.

With this configuration, the force detection apparatus having a smaller width (a length in the direction in which the first base part and the second base part are arranged) than that of related art is obtained.

A force detection apparatus according to an aspect of the invention includes a first base part connectable to a first member, a second base part connectable to a second member, a piezoelectric sensor part placed between the first base part and the second base part, and two fastening portions apply precompression to the piezoelectric sensor part, wherein the two fastening portions are placed so that the piezoelectric sensor part may be located between the portions along a direction respectively tilted relative to a direction in which the first base part and the second base part are arranged and a direction orthogonal to the arrangement direction.

With this configuration, the force detection apparatus having a smaller width (a length in the direction in which the first base part and the second base part are arranged) than that of related art is obtained.

A robot according to an aspect of the invention includes the force detection apparatus according to the aspect of the invention.

With this configuration, the smaller robot that may enjoy the advantages of the force detection apparatus according to the aspect of the invention is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a force detection apparatus and a robot according to the invention will be explained in detail based on embodiments shown in the accompanying drawings.

First Embodiment

Figure 1:
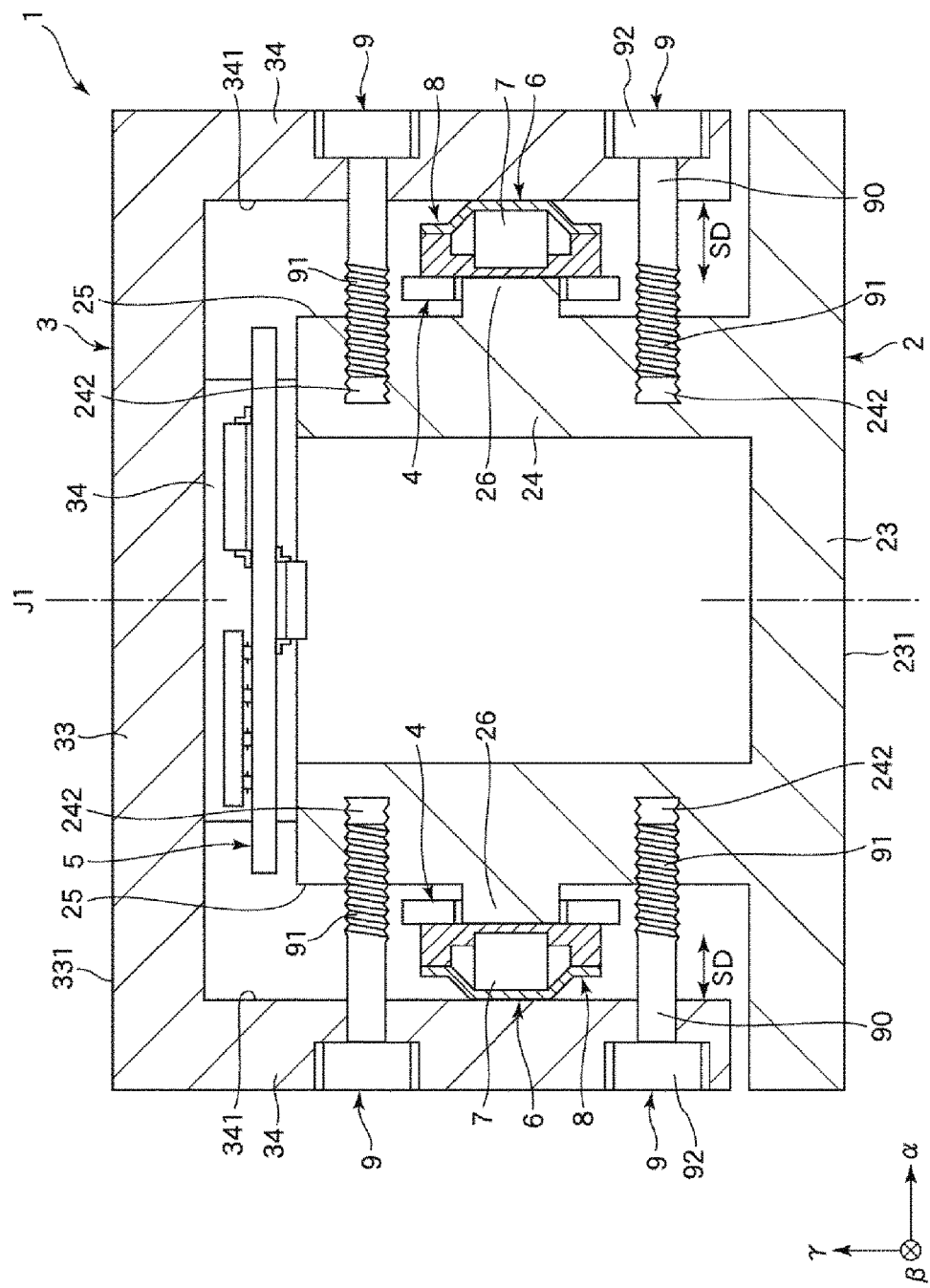
FIG. 1 is a longitudinal sectional view showing a force detection apparatus according to a first embodiment of the invention.
Figure 2:
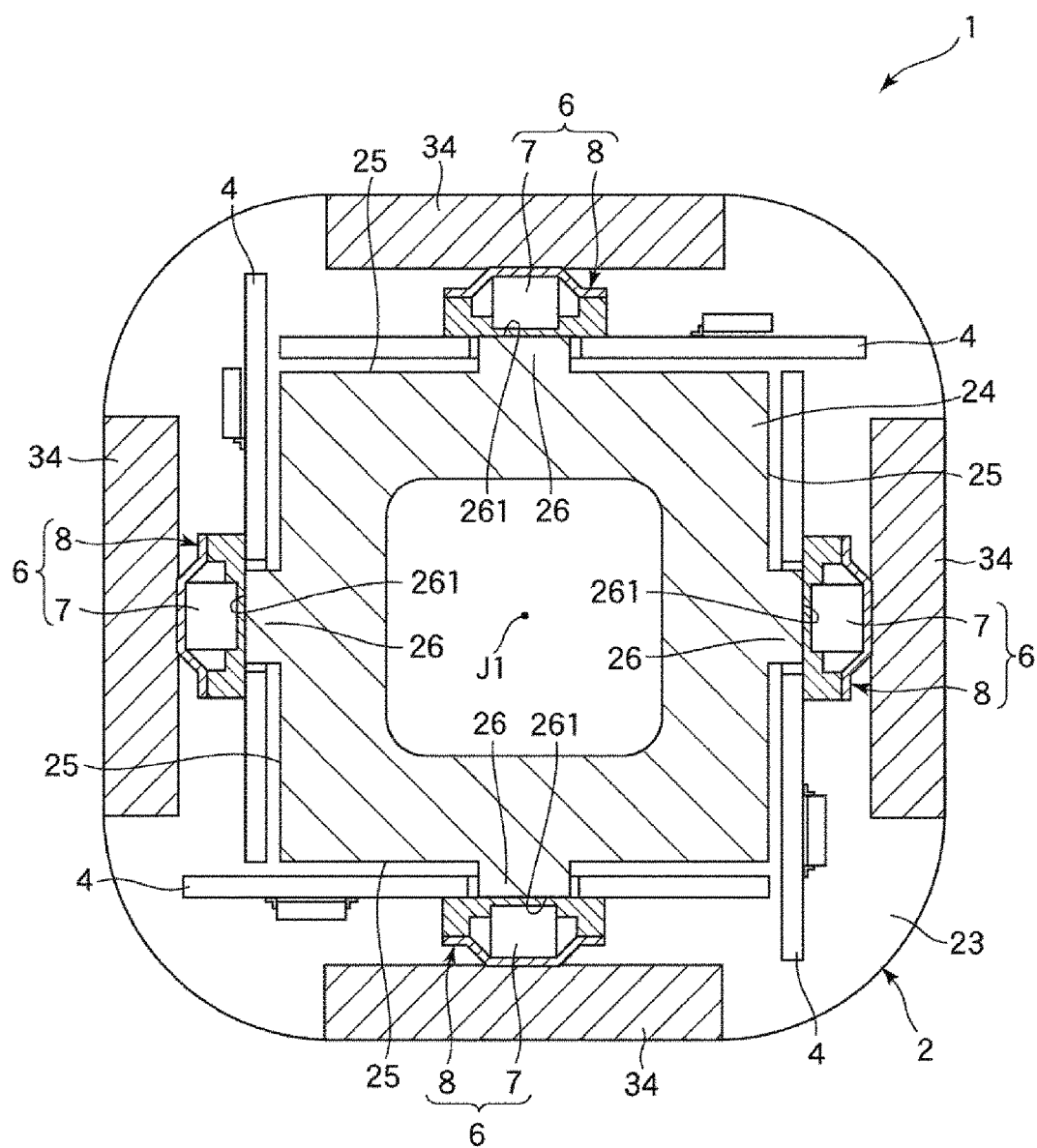
FIG. 2 is a cross sectional view along the force detection apparatus shown in FIG. 1.
Figure 2:
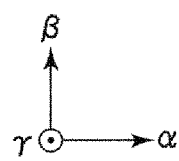
Figure 3:
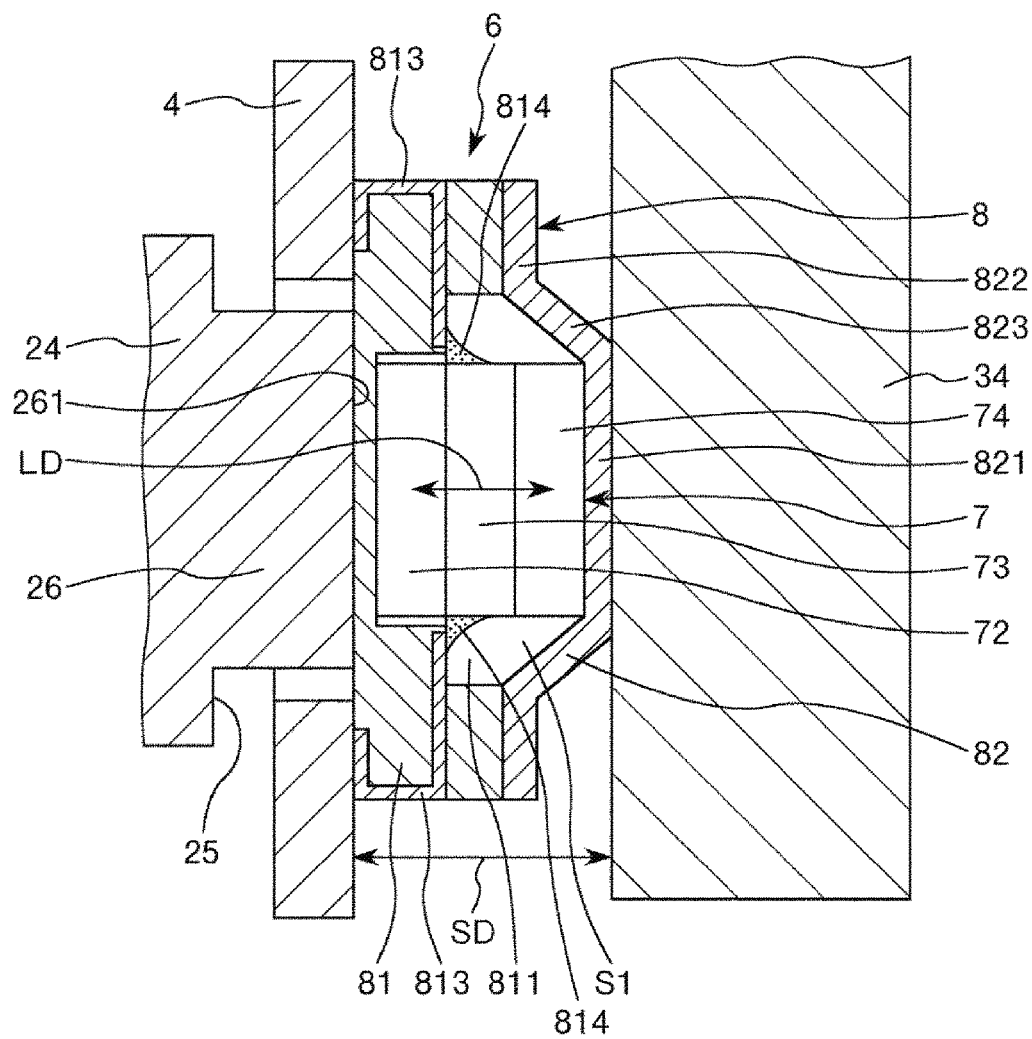
FIG. 3 is a sectional view showing a piezoelectric sensor part of the force detection apparatus shown in FIG. 1.
Figure 4:
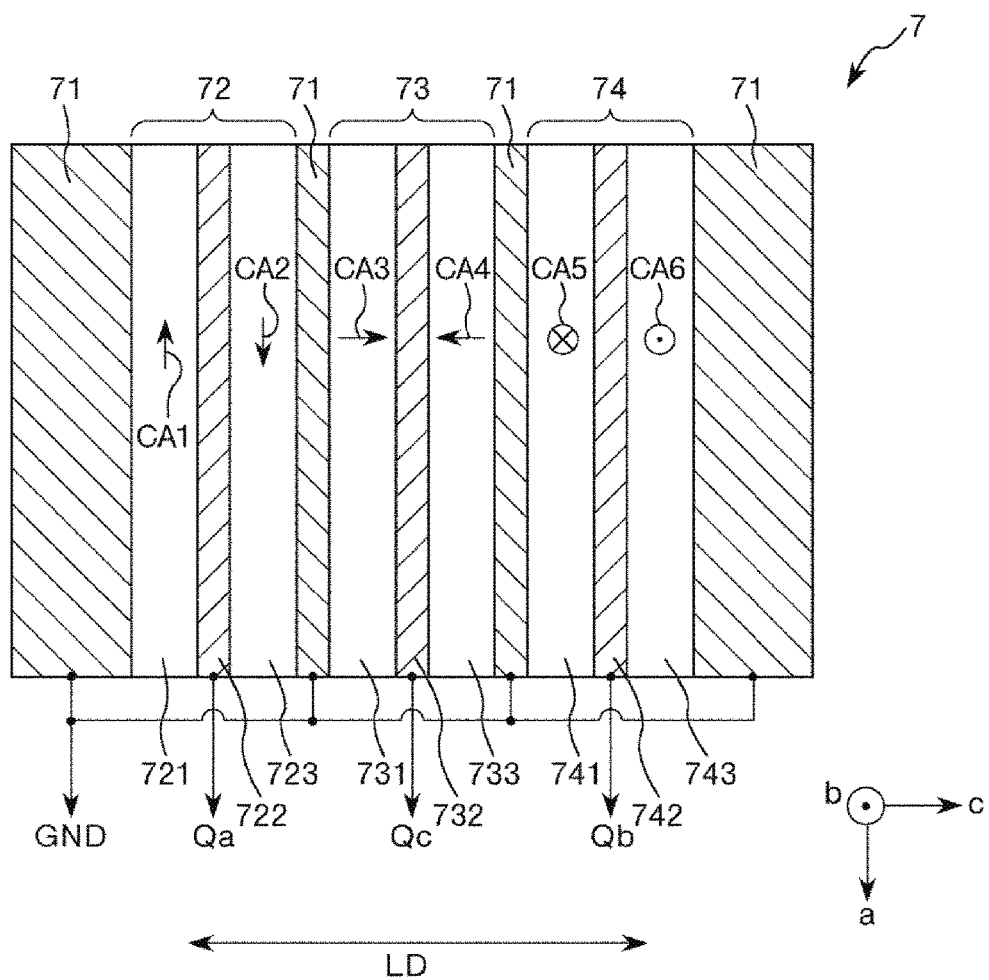
FIG. 4 is a sectional view showing a piezoelectric sensor element of the piezoelectric sensor part shown in FIG. 3.
Figure 5:
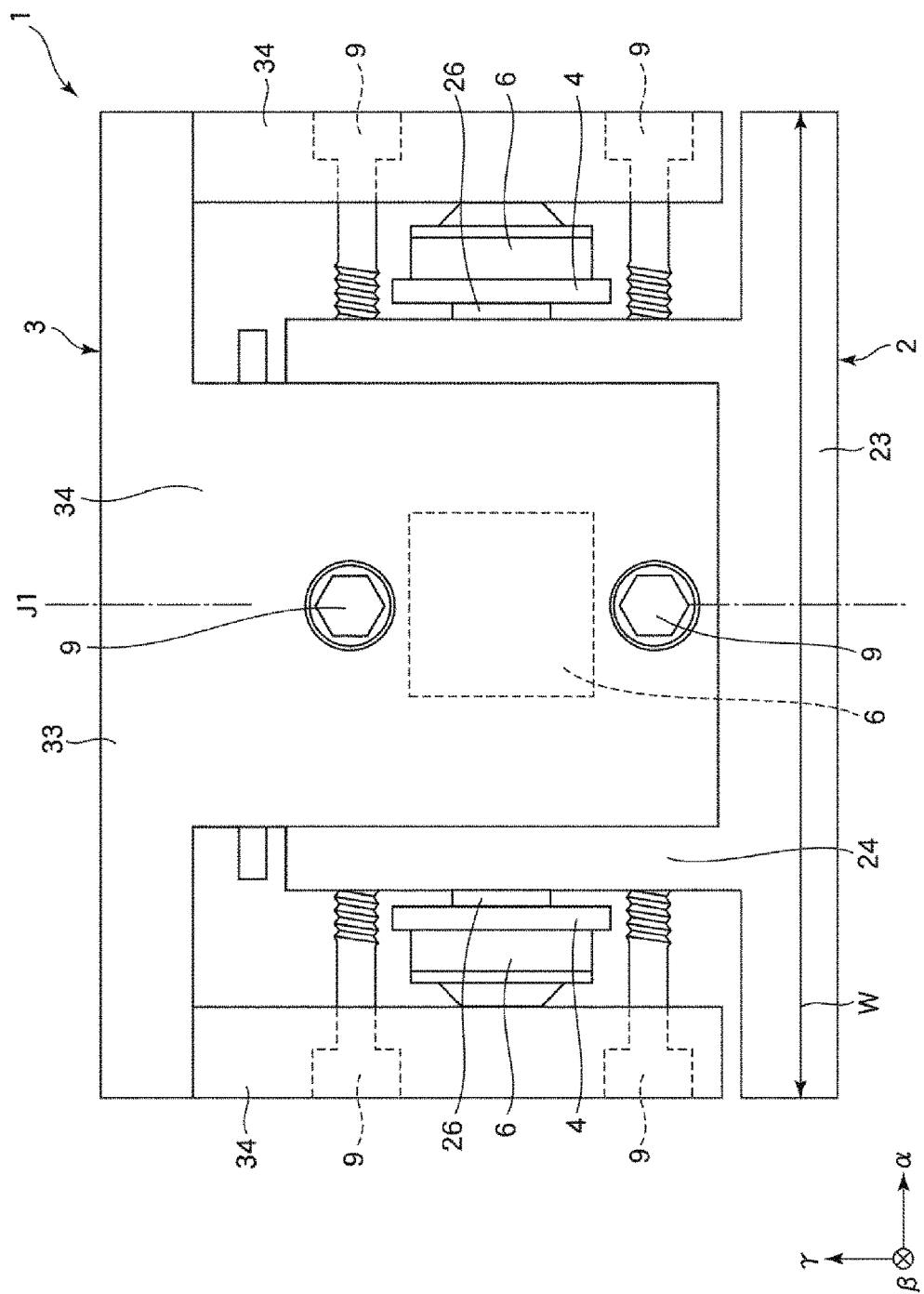
FIG. 5 is a side view of the force detection apparatus shown in FIG. 1.
Figure 6:
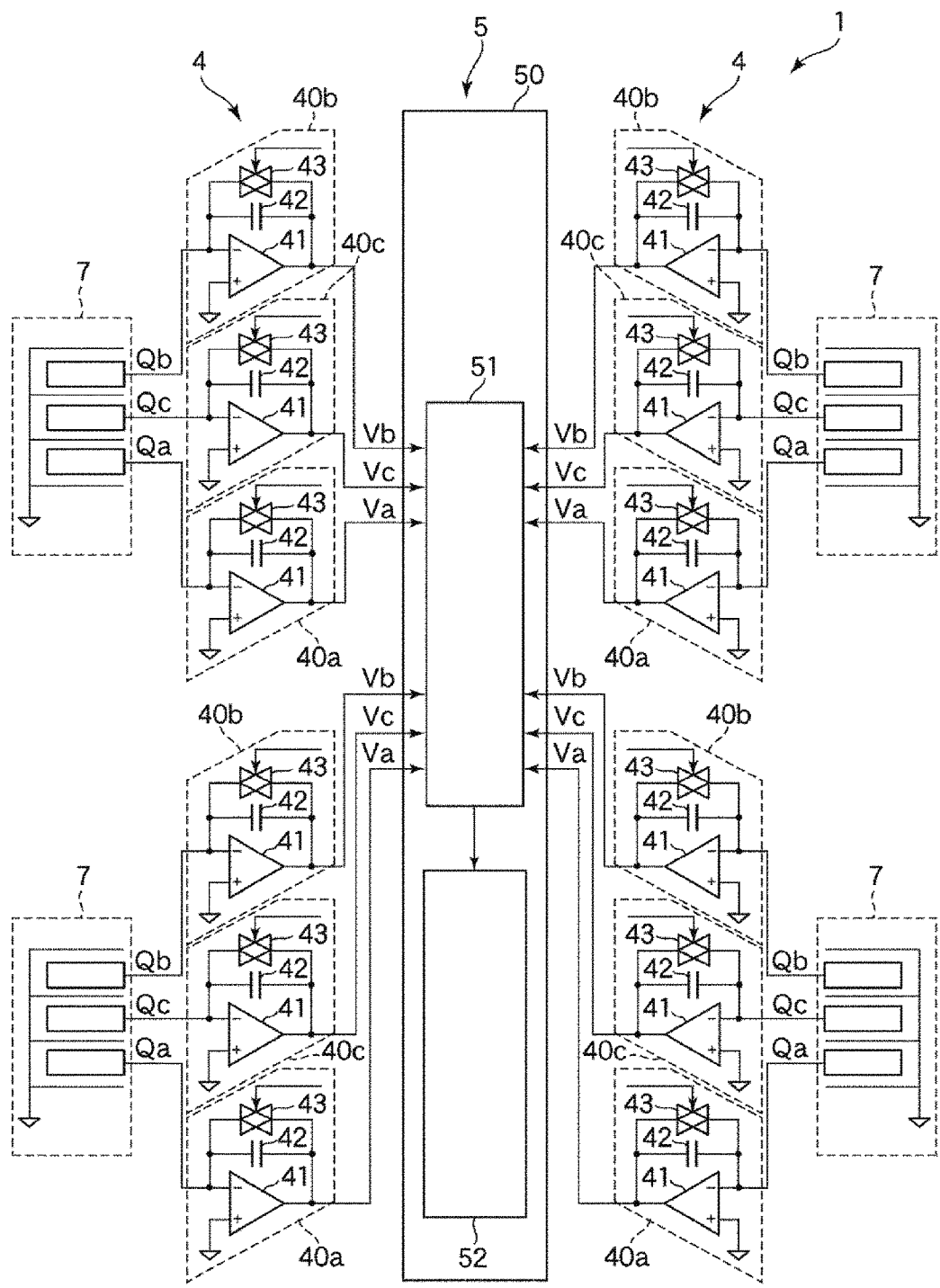
FIG. 6 is a circuit diagram showing a circuit system of the force detection apparatus shown in FIG. 1.

FIG. 1 is a longitudinal sectional view showing a force detection apparatus according to the first embodiment of the invention. FIG. 2 is a cross sectional view along the force detection apparatus shown in FIG. 1. FIG. 3 is a sectional view showing a piezoelectric sensor part of the force detection apparatus shown in FIG. 1. FIG. 4 is a sectional view showing a piezoelectric sensor element of the piezoelectric sensor part shown in FIG. 3. FIG. 5 is a side view of the force detection apparatus shown in FIG. 1. FIG. 6 is a circuit diagram showing a circuit system of the force detection apparatus shown in FIG. 1. Hereinafter, for convenience of explanation, the upside in FIGS. 1 and 5 is also referred to as "upper" and the downside is also referred to as "lower". Further, as shown in FIGS. 1, 2, 3, and 5, hereinafter, three axes orthogonal to one another are referred to as an α-axis, a β-axis, and a γ-axis, and the direction parallel to the α-axis is also referred to as "α-axis direction", the direction parallel to the β-axis is also referred to as "β-axis direction", and the direction parallel to the γ-axis is also referred to as "γ-axis direction".

A force detection apparatus 1 shown in FIG. 1 may respectively detect a translational force component in the α-axis direction, a translational force component in the β-axis direction, a translational force component in the γ-axis direction, a rotational force component in the α-axis direction, a rotational force component in the β-axis direction, and a rotational force component in the γ-axis direction.

As shown in FIG. 1, the force detection apparatus 1 has a first base part 2 (first connection part) functioning as a base plate, a second base part 3 (second connection part) placed at a predetermined distance from the first base part 2 and functioning as a cover plate opposed to the first base part 2, four analog circuit boards 4 placed between the first base part 2 and the second base part 3, a digital circuit board 5 placed between the first base part 2 and the second base part 3 and electrically connected to the analog circuit boards 4, four piezoelectric sensor parts 6 mounted on the respective analog circuit boards 4 and outputting signals according to applied external forces, and eight precompression bolts 9 as fastening members.

The first base part 2 has a plate-like bottom plate 23, and a wall portion 24 stood upward (i.e., in the normal direction of the bottom plate 23) from the bottom plate 23. A lower surface 231 of the bottom plate 23 serves as an attachment surface (first attachment surface) to a robot 100 when the force detection apparatus 1 is fixed to the robot 100 (first member) for use as will be explained in the fifth embodiment. Further, the plan view shape of the bottom plate 23 is a quadrangular shape with rounded corners. Note that the plan view shape of the bottom plate 23 is not particularly limited, but may be e.g. a circular shape, another polygonal shape than the quadrangular shape, or the like.

As below, an axis passing through the center of the lower surface 231 (force detection apparatus 1) along the normal line (γ-axis) of the lower surface 231 is referred to as "center axis J1 (first axis)".

The wall portion 24 has a tubular shape with a space inside. Further, as shown in FIG. 2, the wall portion 24 has an outer shape in a nearly square shape in the plan view with four surfaces 25 facing outside. The two surfaces 25 of the four surfaces 25 have the normal along the α-axis and the other two surfaces 25 have the normal along the β-axis. In the respective surfaces 25, convex portions 26 projecting in the normal directions of those surfaces are placed. Further, top surfaces 261 of the respective convex portions 26 are formed by planes perpendicular to the bottom plate 23. Note that the orientations of the top surfaces 261 of the respective convex portions 26 are not particularly limited, but may be inclined with respect to the planes perpendicular to the bottom plate 23.

As shown in FIG. 1, the second base part 3 has a plate-like top plate 33, and four wall portions 34 stood downward from the outer edge portion of the top plate 33. An upper surface 331 of the top plate 33 serves as an attachment surface (second attachment surface) to the robot 100 when the force detection apparatus 1 is fixed to the robot 100 (second member) for use as will be explained in the fifth embodiment. The upper surface 331 (second attachment surface) of the top plate 33 is parallel to the lower surface 231 (first attachment surface) of the bottom plate 23 in the natural state with no external force. Note that the upper surface 331 and the lower surface 231 maybe non-parallel in the natural state. The plan view shape of the top plate 33 is nearly the same as the plan view shape of the bottom plate 23 and a quadrangular shape with rounded corners. Note that the plan view shape of the top plate 33 is not particularly limited, but may be e.g. a circular shape, another polygonal shape than the quadrangular shape, or the like, or may be different from the plan view shape of the bottom plate 23.

The four wall portions 34 are placed in the edge portion of the top plate 33 to project downward from the edge portion. Further, the four wall portions 34 are placed to be opposed in pairs with the four convex portions 26. Inner surfaces 341 of the wall portions 34 are parallel to the top surfaces 261 of the corresponding convex portions 26. The piezoelectric sensor parts 6 are held between the inner surfaces 341 of the respective wall portions 34 and the top surfaces 261 of the corresponding convex portions 26. Hereinafter, the directions in which the piezoelectric sensor parts 6 are held (the directions in which the inner surfaces 341, the piezoelectric sensor parts 6, and the top surfaces 261 are arranged) are also referred to as "holding directions SD".

As above, the first base part 2 and the second base part 3 are explained. The constituent materials of the first base part 2 and the second base part 3 are not particularly limited, but preferably hard materials. The materials include e.g. various metals such as iron, nickel, cobalt, gold, platinum, silver, copper, manganese, aluminum, magnesium, zinc, lead, tin, titanium, tungsten, an alloy or intermetallic compound containing at least one kind of these metals, and oxides, nitrides, carbides of these metals.

Next, the four piezoelectric sensor parts 6 are explained. The four piezoelectric sensor parts 6 are placed at equal intervals (90°) around the center axis J1. These respective piezoelectric sensor parts 6 have functions of outputting three electric charges Qa, Qb, Qc according to external forces applied along the three axes (a-axis, b-axis, c-axis) orthogonal to one another. As shown in FIG. 3, each piezoelectric sensor part 6 has a piezoelectric sensor element 7 and a package 8 housing the piezoelectric sensor element 7.

As shown in FIG. 4, the piezoelectric sensor element 7 has four ground electrode layers 71 grounded to the ground GND, a first sensor 72 that outputs the electric charge Qa according to the external force (shear force) parallel to the a-axis, a second sensor 73 that outputs the electric charge Qc according to the external force (compressive/tensile force) parallel to the c-axis, and a third sensor 74 that outputs the electric charge Qb according to the external force (shear force) parallel to the b-axis. The ground electrode layers 71 and the respective sensors 72, 73, 74 are alternately stacked.

The first sensor 72 has a first piezoelectric substrate 721 having a first crystal axis CA1 oriented in the negative direction of the a-axis, a second piezoelectric substrate 723 having a second crystal axis CA2 oriented in the positive direction of the a-axis, and an output electrode layer 722 provided between the first piezoelectric substrate 721 and the second piezoelectric substrate 723 and outputting the electric charge Qa. The first piezoelectric substrate 721 and the second piezoelectric substrate 723 may be formed using e.g. Y cut quartz crystal plates. Note that the Y cut quartz crystal plate is a quartz plate having a face perpendicular to the Y-axis (mechanical axis) of the quartz crystal as described in JIS C 6704 (2009 edition) and the thickness direction is along the Y-axis. Here, "Y cut quartz crystal plate" of the embodiment includes not only the case where the thickness direction and the Y-axis coincide but also the case where the Y-axis is slightly (e.g. about 10° or less) tilted relative to the thickness direction. Further, in the embodiment, electrodes (ground electrode layers 71 and output electrode layer 722) are placed on the Y cut face of the Y cut quartz crystal plate. The same applies to a fifth piezoelectric substrate 741 and a sixth piezoelectric substrate 743.

The second sensor 73 has a third piezoelectric substrate 731 having a third crystal axis CA3 oriented in the positive direction of the c-axis, a fourth piezoelectric substrate 733 having a fourth crystal axis CA4 oriented in the negative direction of the c-axis, and an output electrode layer 732 provided between the third piezoelectric substrate 731 and the fourth piezoelectric substrate 733 and outputting the electric charge Qc. The third piezoelectric substrate 731 and the fourth piezoelectric substrate 733 may be formed using e.g. X cut quartz crystal plates. Note that the X cut quartz crystal plate is a quartz plate having a face perpendicular to the X-axis (electrical axis) of the quartz crystal as described in JIS C 6704 (2009 edition) and the thickness direction is along the X-axis. Here, "X cut quartz crystal plate" of the embodiment includes not only the case where the thickness direction and the X-axis coincide but also the case where the X-axis is slightly (e.g. about 10° or less) tilted relative to the thickness direction. Further, in the embodiment, electrodes (ground electrode layers 71 and output electrode layer 732) are placed on the X cut face of the X cut quartz crystal plate.

The third sensor 74 has the fifth piezoelectric substrate 741 having a fifth crystal axis CA5 oriented in the negative direction of the b-axis, the sixth piezoelectric substrate 743 having a sixth crystal axis CA6 oriented in the positive direction of the b-axis, and an output electrode layer 742 provided between the fifth piezoelectric substrate 741 and the sixth piezoelectric substrate 743 and outputting the electric charge Qb. The fifth piezoelectric substrate 741 and the sixth piezoelectric substrate 743 may be formed using e.g. Y cut quartz crystal plates. Note that, as seen from the staking direction of the sensors 72, 73, 74, the respective X-axes of the first piezoelectric substrate 721 and the second piezoelectric substrate 723 and the respective X-axes of the fifth piezoelectric substrate 741 and the sixth piezoelectric substrate 743 cross (orthogonally in the embodiment).

In the force detection apparatus 1, a translational force component in the X-axis direction, a translational force component in the Y-axis direction, a translational force component in the Z-axis direction, a rotational force component in the X-axis direction, a rotational force component in the Y-axis direction, and a rotational force component in the Z-axis direction may be detected based on the electric charges Qa, Qb, Qc output from the four piezoelectric sensors 7.

In the embodiment, the respective piezoelectric sensors 7 have the second sensors 73 that output the electric charge Qc according to the force in the c-axis direction, however, the second sensors 73 maybe omitted. This is because all of the translational force component in the X-axis direction, the translational force component in the Y-axis direction, the translational force component in the Z-axis direction, the rotational force component in the X-axis direction, the rotational force component in the Y-axis direction, and the rotational force component in the Z-axis direction applied to the force detection apparatus 1 may be detected without using the output (electric charge Qc) from the second sensors 73, i.e., from the output (electric charge Qa) from the first sensors 72 and the output (electric charge Qb) from the third sensors 74 of the respective piezoelectric sensors 7. As described above, the second sensors 73 are omitted from the respective piezoelectric sensors 7, and thereby, reduction in size (thickness) of the piezoelectric sensors 7 may be realized.

As above, the piezoelectric sensor 7 is explained. As described above, the piezoelectric sensor 7 has the piezoelectric substrates 721, 723, 731, 733, 741, 743 as piezoelectric materials. Accordingly, the piezoelectric sensor part 6 may accurately detect the applied force. Particularly, in the embodiment, the constituent material of the piezoelectric materials (piezoelectric substrates 721, 723, 731, 733, 741, 743) is quartz crystal. Thereby, the piezoelectric sensor part 6 may exert better temperature characteristics, higher mechanical strength (rigidity, load bearing), and higher dynamic range compared to the case of using another piezoelectric material. Accordingly, the applied force may be detected in a wider range with higher accuracy. Thus, the piezoelectric sensor part 6 that may exert the better detection characteristics is obtained.

Note that the constituent material of the piezoelectric materials (piezoelectric substrates 721, 723, 731, 733, 741,

743) is not limited to quartz crystal, but e.g. other materials including lithium niobate ($LiNbO_3$), lithium tantalate ($LiTaO_3$), lead zirconate titanate (PZT), lithium tetraborate ($Li_2B_4O_7$), langasite ($La_3Ga_5SiO_{14}$), potassium niobate ($KNbO_3$), gallium phosphate ($GaPO_4$), gallium arsenide (GaAs), aluminum nitride (AlN), zinc oxide (ZnO, $Zn_2O_3$), barium titanate ($BaTiO_3$), lead titanate ($PbPO_3$), potassium sodium niobate (($K,Na)NbO_3$), bismuth ferrite ($BiFeO_3$), sodium niobate ($NaNbO_3$), bismuth titanate ($Bi_4Ti_3O_{12}$), and sodium bismuth niobate ($Na_{0.5}Bi_{0.5}TiO_3$) than quartz crystal may be used.

As shown in FIG. 3, the package 8 has a base 81 having a concave portion 811, and a lid 82 joined to the base 81 to cover the opening of the concave portion 811 and functioning as a lid. Further, an airtight housing space S1 is formed inside of the package 8 and the piezoelectric sensor 7 is housed in the housing space S1. The atmosphere of the housing space S1 is not particularly limited, but the space may be filled with an inert gas including e.g. nitrogen, argon, helium. Thereby, the atmosphere of the housing space S1 becomes stable and deterioration, corrosion, etc. of the electrodes may be suppressed. Note that the housing space 51 maybe in the vacuum state (at pressure lower than the atmospheric pressure), for example.

The constituent material of the base 81 is not particularly limited, but various ceramics including e.g. aluminum oxide (alumina) and zirconium oxide (zirconia) may be used. Note that, for example, the bottom portion of the base 81 (the portion on which the piezoelectric sensor 7 is mounted) and the side wall portion of the base 81 (the portion stood from the outer edge of the bottom portion) may be formed using different materials. In this case, for example, the bottom portion may be formed using various metal materials including stainless steel, kovar, copper iron, and carbon steel, and the side wall portion may be formed using various ceramics. For example, as the constituent material of the bottom portion, an alloy of kovar having a coefficient of thermal expansion close to that of ceramics is preferably used. Thereby, thermal strain is harder to occur in the package 8, and application of unnecessary stress (other external forces than the precompression and the forces to be detected) to the piezoelectric sensor 7 may be reduced.

Further, as shown in FIG. 3, terminals 813 connecting inside and outside of the housing space S1 are provided in the base 81. The terminals 813 and the piezoelectric sensor 7 are electrically connected via connecting portions 814. Note that the connecting portions 814 are not particularly limited, but e.g. conducting paste including Ag paste, Cu paste, and Au paste may be used.

As shown in FIG. 3, the lid 82 has a center portion 821 located at the center in contact with the piezoelectric sensor 7, an outer edge portion 822 located on the outer edge and joined to the base 81, and a tapered connecting portion 823 located between the center portion 821 and the outer edge portion 822 and connecting the portions. Further, the center portion 821 is provided to project from the outer edge portion 822.

The constituent material of the lid 82 is not particularly limited, but a member having a coefficient of linear expansion approximate to that of the constituent material of the base 81 is preferably used. For example, when the above described ceramics is used for the constituent material of the base 81, a metal material (e.g. an alloy of kovar or the like) is preferably used for the constituent material of the lid 82. Thereby, thermal strain is harder to occur in the package 8, and application of unnecessary stress (other external forces than the precompression and the forces to be detected) to the piezoelectric sensor 7 may be reduced. Accordingly, the force detection apparatus 1 with higher force detection accuracy is obtained.

As above, the piezoelectric sensor part 6 is explained. The configuration of the piezoelectric sensor part 6 is not particularly limited, but e.g. the package 8 may be omitted.

As described above, the piezoelectric sensor parts 6 are placed one by one between the pairs of the wall portions 34 and the convex portions 26. Further, each piezoelectric sensor part 6 is placed to be sandwiched between the wall portion 34 and the convex portion 26 with the bottom surface of the base 81 toward the convex portion 26 side and the lid 82 toward the wall portion 34 side. Accordingly, when the stacking direction of the sensors 72, 73, 74 is referred to as "stacking direction LD", the stacking direction LD coincides (is parallel) with the holding direction SD. Note that the stacking direction LD is not particularly limited, but may be tilted relative to the holding direction SD or orthogonal to the holding direction SD.

As shown in FIG. 1, the first base part 2 and the second base part 3 are connected and secured by the precompression bolts 9. By the precompression bolts 9, the respective piezoelectric sensors 7 are precompressed to be compressed in the holding directions SD (stacking directions LD). As described above, the piezoelectric sensors 7 are precompressed, and thereby, the output when an external force is applied becomes stable and the applied external force may be accurately detected.

Specifically, each precompression bolt 9 has a rod-like main body portion 90, a head portion 92 provided on the base end of the main body portion 90, and a threaded portion 91 provided in the main body portion 90, and the head portion 92 engages with the wall portion 34 of the second base part 3 and the threaded portion 91 is screwed into the wall portion 24 of the first base part 2. Accordingly, the precompression bolt 9 is fastened, and thereby, the piezoelectric sensor 7 located between the wall portions 24, 34 may be precompressed to be compressed. That is, the threaded portion 91 may be referred to as a fastening portion that fastens the wall portion 24 and the wall portion 34.

Note that "securement" by the precompression bolts 9 is performed while the relative movement of two objects to be secured in a predetermined amount is allowed. That is, the first base part 2 and the second base part 3 secured by the precompression bolts 9 may be displaced at least one relative to the other within a predetermined range. Thereby, the applied external force may be transmitted to the piezoelectric sensor 7 more reliably.

Further, there are the eight (plurality of) precompression bolts 9 in total and, as shown in FIG. 1, two precompression bolts 9 serve to precompress one piezoelectric sensor part 6. The two precompression bolts 9 corresponding to a predetermined piezoelectric sensor part 6 are placed on both sides of the piezoelectric sensor part 6 so that the corresponding piezoelectric sensor part 6 may be located between the bolts. Thereby, the piezoelectric sensor part 6 may be precompressed from both sides in the γ-axis direction with balance.

Particularly, in the embodiment, as shown in FIG. 5, the two precompression bolts 9 (threaded portions 91) corresponding to a predetermined piezoelectric sensor part 6 are placed along the direction of the center axis J1 (the direction parallel to the center axis J1). Thereby, compared to the configuration in which the two precompression bolts 9 are placed along the direction orthogonal to the center axis J1 of related art, the width W of the force detection apparatus 1 (the length in the direction orthogonal to the center axis J1) is smaller. Accordingly, the smaller force detection apparatus 1 with suppressed planar spread is obtained. Note that, in the embodiment, the corresponding two precompression bolts 9 are placed along the direction of the center axis J1 with respect to each piezoelectric sensor part 6, however, not limited to that. The corresponding two precompression bolts 9 may be placed along the direction of the center axis J1 with respect to at least one piezoelectric sensor part 6.

As shown in FIG. 1, internal thread portions 242 screwed together with the threaded portions 91 of the respective precompression bolts 9 are provided in the wall portions 24 of the first base part 2. The respective precompression bolts 9 are inserted from the second base part side into the first base part 2 with the respective piezoelectric sensor parts 6 placed between the first base part 2 and the second base part 3. Further, the threaded portions 91 of the respective precompression bolts 9 are screwed into the internal thread portions 242 to apply pressure having predetermined magnitude, i.e., precompression to the respective piezoelectric sensors 7 in the holding directions SD. Thereby, when a shear force acts on the piezoelectric sensor 7, a friction force is generated between the piezoelectric substrates of the piezoelectric sensor 7, and the electric charge is output from the piezoelectric sensor 7 more reliably. Note that the magnitude of the compression may be adjusted by adjustment of the amount of fastening of the precompression bolt 9. The constituent material of the precompression bolt 9 is not particularly limited, but e.g. various metal materials, various resin materials, etc. may be used. As above, the precompression bolt 9 is explained.

Note that, in the embodiment, the configuration of the threaded portion 91 (precompression bolt 9) is shown as the fastening portion, however, the fastening portion is not limited to the threaded portion 91, but may be an elastic member including a rivet, clamp, spring, resin, or the like as long as a force may be applied so that the distance between the wall portion 24 and the wall portion 34 may be smaller.

Next, the four analog circuit boards 4 and the single digital circuit board 5 are explained. As shown in FIG. 1, the analog circuit boards 4 and the digital circuit board 5 are respectively placed (housed) between the first base part 2 and the second base part 3. Specifically, the four analog circuit boards 4 are placed on the bottom surfaces of the packages 8 of the respective piezoelectric sensor parts 6. The respective analog circuit boards 4 are placed not to hinder the contact between the convex portions 26 and the packages 8 and screwing of the precompression bolts 9 and the internal thread portions 242 in order to avoid the parts by formation of through holes or the like. Further, the single digital circuit board 5 is placed between the wall portion 24 of the first base part 2 and the top plate 33 of the second base part 3. Note that the placement of the respective analog circuit boards 4 and the digital circuit board 5 is not particularly limited, but the boards may be placed outside of the first base part 2 and the second base part 3. Or, the respective analog circuit boards 4 and the digital circuit board 5 may be omitted. In this case, for example, an external apparatus to which the force detection apparatus 1 is connected may have a circuit part having the same functions.

As shown in FIG. 6, each analog circuit board 4 includes a conversion output circuit 40*a* that converts the electric charge Qa output from the corresponding piezoelectric sensor 7 into a voltage Va, a conversion output circuit 40*b* that converts the electric charge Qb output from the corresponding piezoelectric sensor 7 into a voltage Vb, and a conversion output circuit 40*c* that converts the electric charge Qc output from the corresponding piezoelectric sensor 7 into a voltage Vc. Further, the conversion output circuits 40*a*, 40*b*, 40*c* each has an operational amplifier 41, a capacitor 42, and a switching element 43.

The digital circuit board 5 includes an external force detection circuit 50 that detects an applied external force. The external force detection circuit 50 has a function of detecting the applied external force based on the voltage Va output from the respective conversion output circuits 40*a*, the voltage Vb output from the respective conversion output circuits 40*b*, and the voltage Vc output from the respective conversion output circuits 40*c*. As shown in FIG. 6, the external force detection circuit 50 has an AD converter 51 connected to the conversion output circuits 40*a*, 40*b*, 40*c*, and a calculation unit 52 (arithmetic circuit) connected to the AD converter 51.

The AD converter 51 has a function of converting the voltages Va, Vb, Vc from analog signals into digital signals. Then, the voltages Va, Vb, Vc digitally converted by the AD converter 51 are input to the calculation unit 52. The calculation unit 52 respectively detect the translational force component in the α-axis direction, the translational force component in the β-axis direction, the translational force component in the γ-axis direction, the rotational force component in the α-axis direction, the rotational force component in the β-axis direction, and the rotational force component in the γ-axis direction.

As above, the configuration of the force detection apparatus 1 is explained. As described above, the force detection apparatus 1 has the plurality of piezoelectric sensor parts 6 placed around the center axis J1 (first axis) and the two threaded portions 91 (precompression bolts 9) provided in correspondence with each piezoelectric sensor part 6 and applying precompression to the corresponding piezoelectric sensor part 6. Further, the two threaded portions 91 are placed so that the piezoelectric sensor part 6 may be located between the portions along the direction of the center axis J1. Thereby, compared to the configuration in which the two threaded portions 91 are placed in the direction orthogonal to the center axis J1 of related art, the width W of the force detection apparatus 1 is smaller (see FIG. 5). Accordingly, the smaller force detection apparatus 1 with suppressed planar spread is obtained. Note that "so that the piezoelectric sensor part may be located between the portions" means that the piezoelectric sensor part 6 is located between the main body portions 90 of the two precompression bolts 9 in the plan view as seen from the axis direction of the precompression bolts 9.

Note that, in the embodiment, the two precompression bolts 9 (threaded portions 91) are placed for one piezoelectric sensor part 6, however, the number of precompression bolts 9 placed for one piezoelectric sensor part 6 is not particularly limited as long as the number is two or more and may be three or more. In this case, it is particularly preferable that all of the precompression bolts 9 are placed along the center axis J1.

Further, in the embodiment, the center of the piezoelectric sensor part 6 is located on the line segment connecting the two precompression bolts 9, however, the position of the center of the piezoelectric sensor part 6 is not limited to that, but may be off the line segment connecting the two precompression bolts 9.

As described above, in the force detection apparatus 1, the four piezoelectric sensor parts 6 are provided around the center axis J1. Thereby, the force applied to the force detection apparatus 1 (specifically, the translational force component in the α-axis direction, the translational force component in the β-axis direction, the translational force component in the γ-axis direction, the rotational force component in the α-axis direction, the rotational force component in the β-axis direction, and the rotational force component in the γ-axis direction) may be respectively accurately detected based on the output from the respective piezoelectric sensor parts 6. Further, the proper number of piezoelectric sensor parts 6 may be placed and upsizing of the apparatus may be suppressed.

Note that the number of piezoelectric sensor parts 6 of the force detection apparatus 1 is not particularly limited, but may be e.g. one, two, three, five or more. Further, in the embodiment, the four piezoelectric sensor parts 6 are placed around the center axis J1 at equal intervals, however, may be placed at different intervals. Furthermore, in the embodiment, the opposed two piezoelectric sensor parts 6 are placed along the α-axis and the other two piezoelectric sensor parts 6 are placed along the β-axis, however, the direction in which the opposed two piezoelectric sensor parts 6 are placed may be tilted relative to the α-axis and the β-axis.

As described above, in the force detection apparatus 1, each of the plurality of piezoelectric sensor parts 6 has the plurality of piezoelectric substrates. Specifically, each piezoelectric sensor part 6 of the embodiment has the six piezoelectric substrates 721, 723, 731, 733, 741, 743. As described above, the plurality of piezoelectric substrates are provided and, for example, when the orientation directions of the respective piezoelectric substrates 721, 723, 731, 733, 741, 743 are made different, and thereby, the force detection apparatus 1 may detect forces in different axis directions. Specifically, in the embodiment, the translational force component in the α-axis direction, the translational force component in the β-axis direction, the translational force component in the γ-axis direction, the rotational force component in the α-axis direction, the rotational force component in the β-axis direction, and the rotational force component in the γ-axis direction can be detected. Further, for example, like the piezoelectric substrates 721, 723, the orientation directions of the two piezoelectric substrates are set in the opposite directions, and thereby, output (electric charge) may be increased. Accordingly, the force detection apparatus 1 that may exert the better force detection characteristics is obtained.

As described above, in the force detection apparatus 1, the plurality of piezoelectric substrates 721, 723, 731, 733, 741, 743 are stacked in the direction crossing the center axis J1 (holding direction). Thereby, for example, compared to the case where the plurality of piezoelectric substrates 721, 723, 731, 733, 741, 743 are stacked in the direction along the center axis J1, the size, particularly, the height of the force detection apparatus 1 may be made smaller. Particularly, in the embodiment, the stacking direction LD of the plurality of piezoelectric substrates 721, 723, 731, 733, 741, 743 is orthogonal to the center axis J1, and thus, the above described advantage is more remarkable.

The stacking direction LD of the plurality of piezoelectric substrates 721, 723, 731, 733, 741, 743 is not particularly limited, but may be along the center axis J1 or along a direction tilted relative to both the direction along the center axis J1 and the direction orthogonal to the center axis J1.

Further, as described above, in the force detection apparatus 1, the plurality of piezoelectric substrates include the Y cut quartz crystal plates. Specifically, each of the plurality of piezoelectric sensor parts 6 has the piezoelectric substrates 721, 723, 741, 743 as the Y cut quartz crystal plates. As described above, the piezoelectric substrates include the Y cut quartz crystal plates, and thereby, the shear force component (the force component in the perpendicular direction to the holding direction SD) applied to the piezoelectric sensor part 6 may be accurately detected.

Second Embodiment

Next, a force detection apparatus according to the second embodiment of the invention will be explained.

Figure 7:
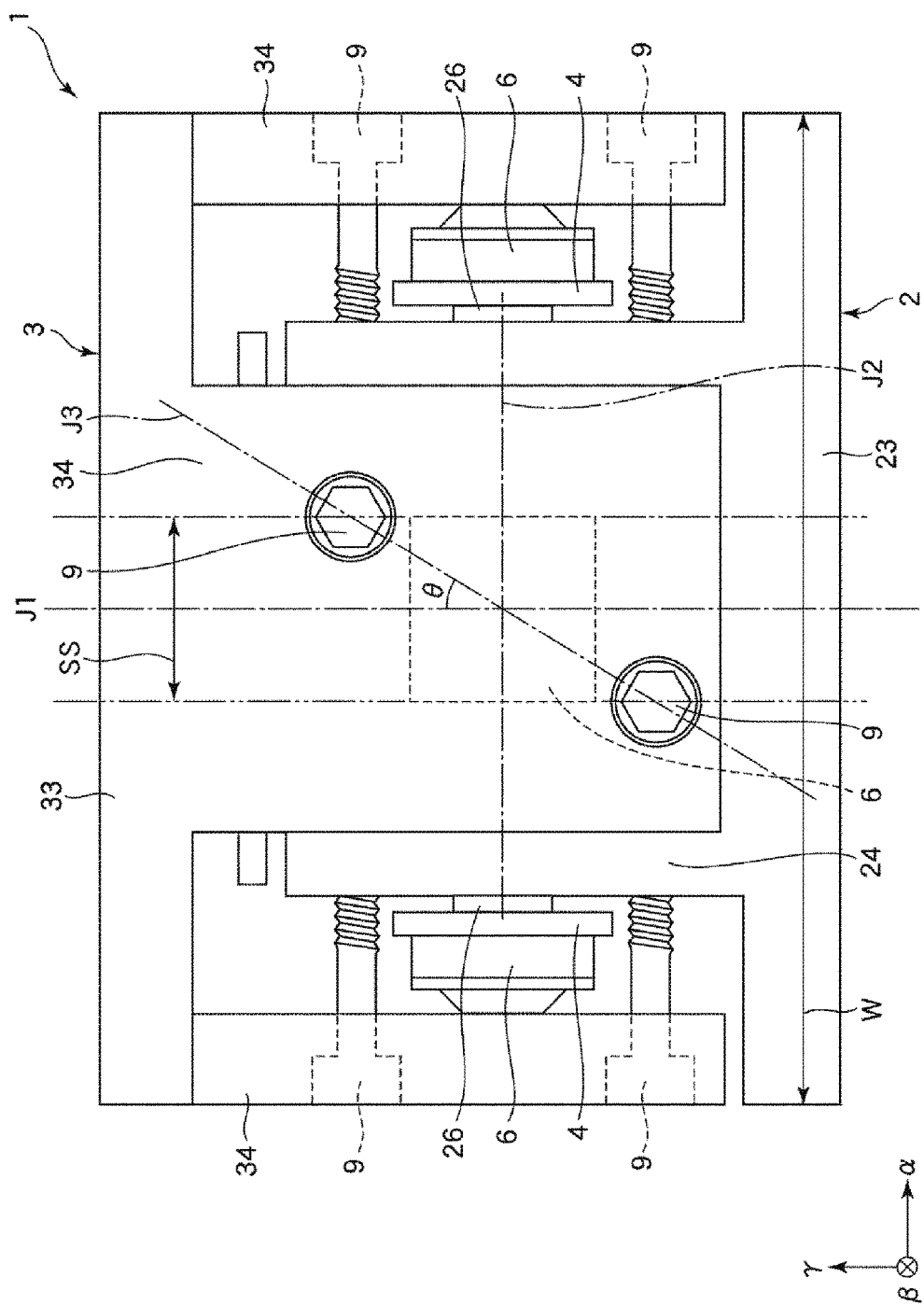
FIG. 7 is a side view of a force detection apparatus according to a second embodiment of the invention.

FIG. 7 is a side view of the force detection apparatus according to the second embodiment of the invention.

The force detection apparatus 1 of the embodiment is nearly the same as the above described force detection apparatus 1 of the first embodiment except that the placement of the precompression bolts 9 is different.

As below, the force detection apparatus 1 of the second embodiment will be explained with a focus on the differences from the above described first embodiment and the explanation of the same items will be omitted. Note that the same configurations as those of the above described embodiment have the same signs.

In the force detection apparatus 1 of the embodiment, as shown in FIG. 7, the two precompression bolts 9 corresponding to a predetermined piezoelectric sensor part 6 are placed along a direction of a third axis J3 tilted relative to both the center axis J1 and a second axis J2 orthogonal to the center axis J1 in the plan view from the holding direction SD (the direction in which the inner surface 341, the piezoelectric sensor part 6, and the top surface 261 are arranged). According to the configuration, compared to the configuration in which the two precompression bolts 9 are placed along the direction orthogonal to the center axis J1 of related art, the width W of the force detection apparatus 1 may be made smaller. Accordingly, the smaller force detection apparatus 1 with suppressed planar spread is obtained.

Here, it is preferable that each of the two precompression bolts 9 forming a pair is placed to at least partially overlap with an area SS formed by virtually extending the corresponding piezoelectric sensor part 6 in the center axis J1 direction. In other words, it is preferable that each of the two precompression bolts 9 forming a pair is placed to at least partially opposed to the piezoelectric sensor part 6 in the center axis J1 direction. Thereby, the above described advantage may be offered more reliably.

Further, the tilt angle θ of the third axis J3 relative to the center axis J1 in the plan view from the holding direction SD is not particularly limited, but preferably equal to or less than ±45°, more preferably equal to or less than ±30°, yet more preferably equal to or less than ±15° (except) 0°). Thereby, the width W of the force detection apparatus 1 may be made even smaller. Note that the tilt angles θ may be the same among the four piezoelectric sensor parts 6 or at least one of the angles may be different from the others.

As above, the force detection apparatus 1 of the embodiment is explained. The force detection apparatus 1 has the plurality of piezoelectric sensor parts 6 placed around the center axis J1 (first axis) and the two threaded portions 91 (precompression bolts 9) provided in correspondence with each piezoelectric sensor part 6 and applying precompression to the corresponding piezoelectric sensor part 6. Further, the two threaded portions 91 are placed so that the piezoelectric sensor part 6 may be located between the portions along the direction of the third axis J3 respectively tilted relative to the center axis J1 and the second axis J2 orthogonal to the center axis J1. Thereby, compared to the configuration in which the two threaded portions 91 are placed in the direction orthogonal to the center axis J1 of related art, the width W of the force detection apparatus 1 may be made smaller. Accordingly, the smaller force detection apparatus 1 with suppressed planar spread is obtained.

According to the second embodiment, the same advantages as those of the above described first embodiment may be offered.

Third Embodiment

Next, a force detection apparatus according to the third embodiment of the invention will be explained.

Figure 8:
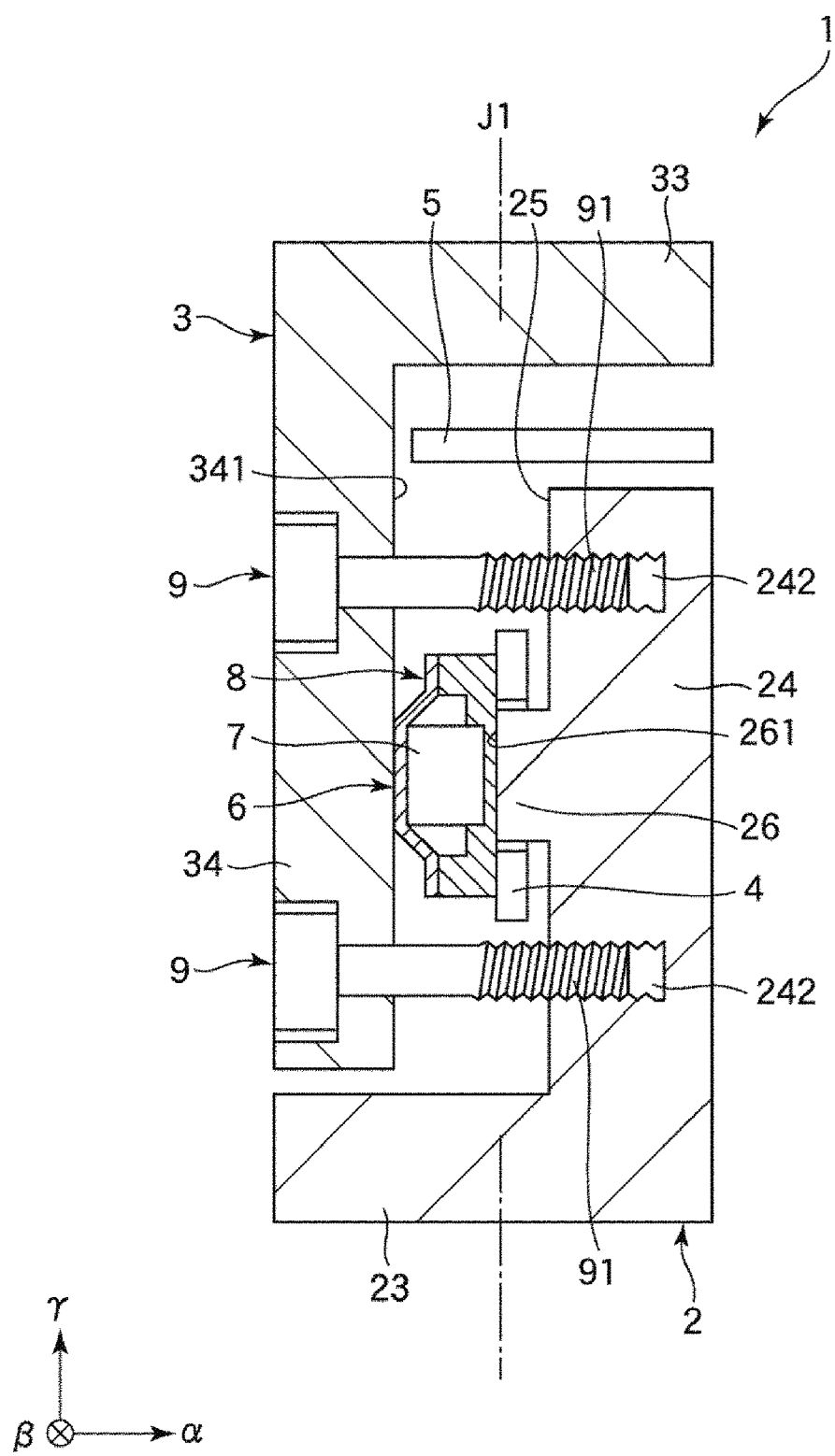
FIG. 8 is a longitudinal sectional view showing a force detection apparatus according to a third embodiment of the invention.
Figure 9:
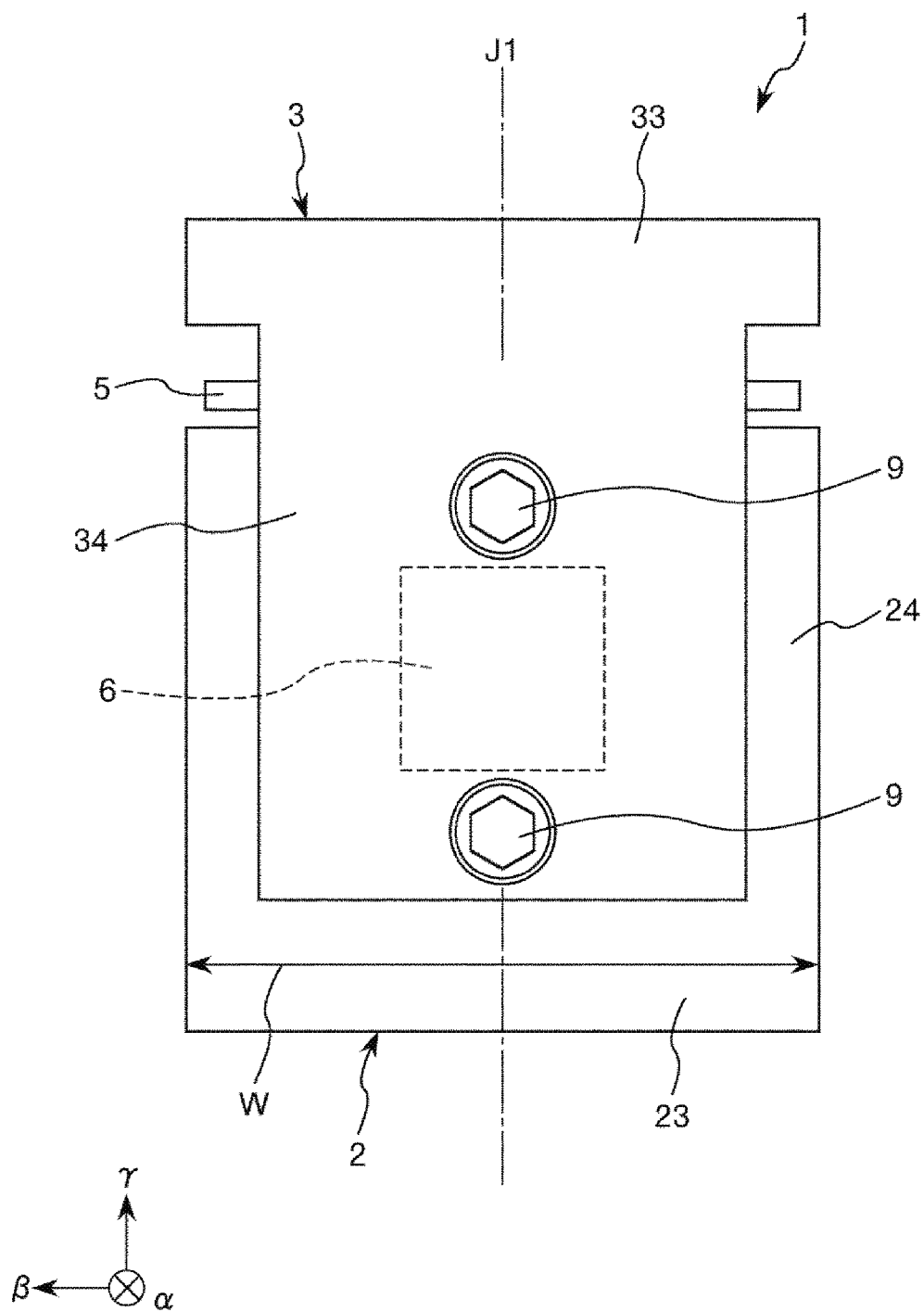
FIG. 9 is a side view of the force detection apparatus shown in FIG. 8.

FIG. 8 is a longitudinal sectional view showing a force detection apparatus according to the third embodiment of the invention. FIG. 9 is a side view of the force detection apparatus shown in FIG. 8.

The force detection apparatus 1 according to the embodiment is nearly the same as the above described force detection apparatus 1 of the first embodiment except that the number of piezoelectric sensor parts 6 is different and the configurations of the first base part 2 and the second base part 3 are different according thereto.

As below, the force detection apparatus 1 of the third embodiment will be explained with a focus on the differences from the above described first embodiment and the explanation of the same items will be omitted. Note that the same configurations as those of the above described embodiments have the same signs.

As shown in FIGS. 8 and 9, the force detection apparatus 1 of the embodiment has the single piezoelectric sensor part 6. Further, in correspondence therewith, the force detection apparatus 1 has the two precompression bolts (threaded portions 91). Further, the two precompression bolts 9 are placed with the piezoelectric sensor part 6 in between along the center axis J1.

The force detection apparatus 1 has a first base part 2 connectable to a first member (e.g. a fifth arm 125, which will be described later), a second base part 3 connectable to a second member (e.g. a sixth arm 126, which will be described later), the piezoelectric sensor part 6 placed between the first base part 2 and the second base part 3, and the two threaded portions 91 that apply precompression to the piezoelectric sensor part 6. Further, the two threaded portions 91 are placed so that the piezoelectric sensor part 6 may be located between the portions along the direction in which the first base part 2 and the second base part 3 are arranged (i.e., the direction of the center axis J1). According to the configuration, compared to the configuration in which the two precompression bolts 9 are placed along the direction orthogonal to the center axis J1 of related art, the width W of the force detection apparatus 1 may be made smaller. Accordingly, the smaller force detection apparatus 1 with suppressed planar spread is obtained.

Note that, in the embodiment, the two precompression bolts 9 (threaded portions 91) are placed for one piezoelectric sensor part 6, however, the number of precompression bolts 9 placed for one piezoelectric sensor part 6 is not particularly limited as long as the number is two or more and may be three or more. In this case, it is particularly preferable that all of the precompression bolts 9 are placed along the center axis J1.

According to the third embodiment, the same advantages as those of the above described first embodiment may be offered.

Fourth Embodiment

Next, a force detection apparatus according to the fourth embodiment of the invention will be explained.

Figure 10:
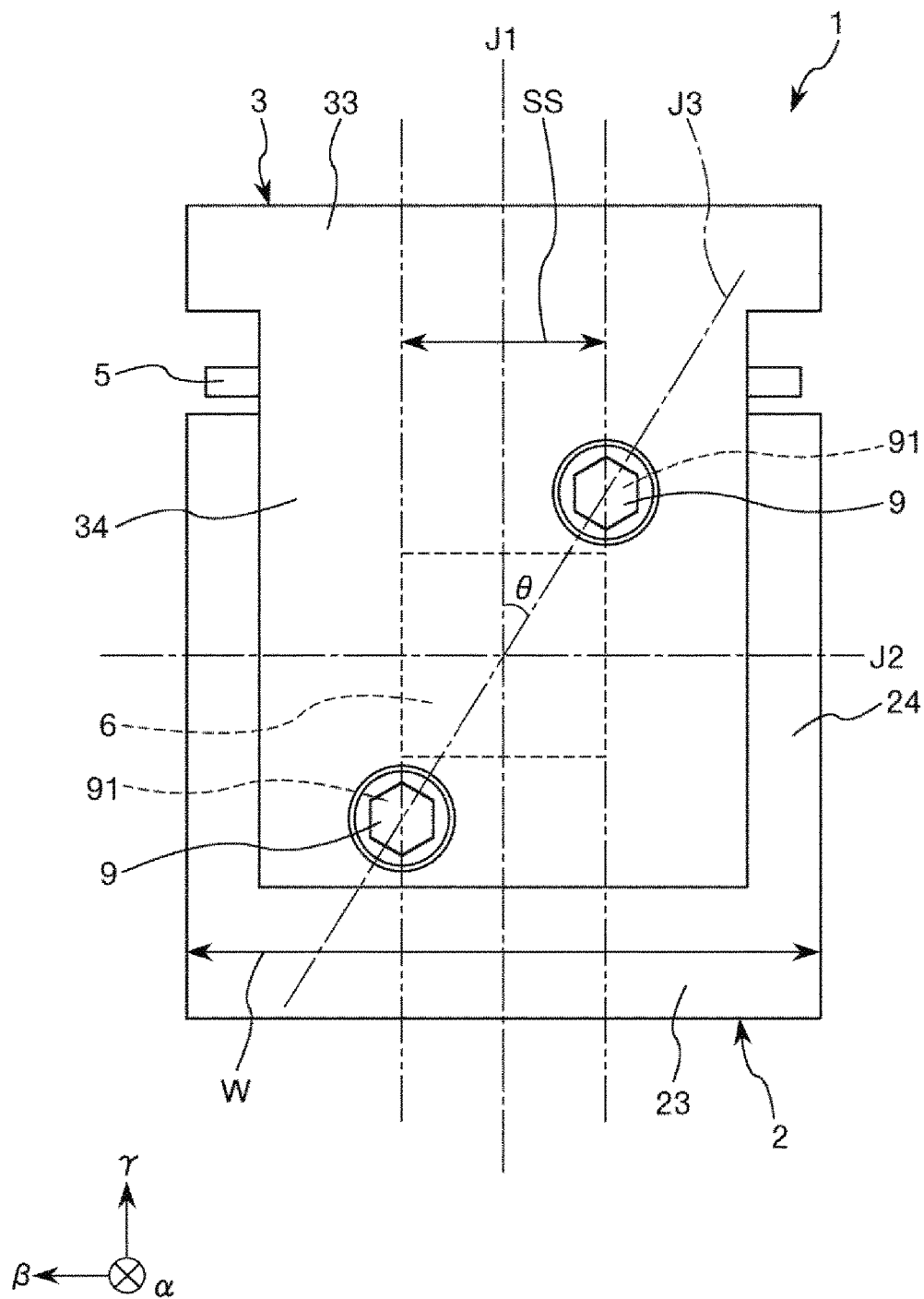
FIG. 10 is aside view of a force detection apparatus according to a fourth embodiment of the invention.

FIG. 10 is a side view of the force detection apparatus according to the fourth embodiment of the invention.

The force detection apparatus 1 according to the embodiment is nearly the same as the above described force detection apparatus 1 of the third embodiment except that the placement of the precompression bolts 9 is different.

As below, the force detection apparatus 1 of the fourth embodiment will be explained with a focus on the differences from the above described third embodiment and the explanation of the same items will be omitted. Note that the same configurations as those of the above described embodiments have the same signs.

In the force detection apparatus 1 of the embodiment, as shown in FIG. 10, the two precompression bolts 9 (threaded portions 91) are placed along the direction of the third axis J3 tilted relative to both the center axis J1 and the second axis J2 orthogonal to the center axis J1. According to the configuration, compared to the configuration in which the two precompression bolts 9 are placed along the direction orthogonal to the center axis J1 of related art, the width W of the force detection apparatus 1 may be made smaller. Accordingly, the smaller force detection apparatus 1 with suppressed planar spread is obtained.

Here, it is preferable that each of the two precompression bolts 9 is placed to at least partially overlap with an area SS formed by virtually extending the corresponding piezoelectric sensor part 6 in the center axis J1 direction. In other words, it is preferable that each of the two precompression bolts 9 forming a pair is placed to be at least partially opposed to the piezoelectric sensor part 6. Thereby, the above described advantage may be offered more reliably.

Further, the tilt angle θ of the third axis J3 with respect to the center axis J1 is not particularly limited, but preferably equal to or less than ±45°, more preferably equal to or less than ±30°, yet more preferably equal to or less than ±15° (except 0°). Thereby, the width W of the force detection apparatus 1 may be made even smaller.

As above, the force detection apparatus 1 of the embodiment is explained. The force detection apparatus 1 has the first base part 2 connectable to the first member, the second base part 3 connectable to the second member, the piezoelectric sensor part 6 placed between the first base part 2 and the second base part 3, and the two threaded portions 91 that apply precompression to the piezoelectric sensor part 6. Further, the two threaded portions 91 are placed so that the piezoelectric sensor part 6 may be located between the portions along the direction (the direction of the third axis J3) respectively tilted relative to the direction in which the first base part 2 and the second base part 3 are arranged (the direction of the center axis J1) and the direction orthogonal to the arrangement direction (the direction of the second axis J2). Thereby, compared to the configuration in which the two threaded portions 91 are placed in the direction orthogonal to the center axis J1 of related art, the width W of the force detection apparatus 1 may be made smaller. Accordingly, the smaller force detection apparatus 1 with suppressed planar spread is obtained.

According to the fourth embodiment, the same advantages as those of the above described first embodiment may be offered.

Fifth Embodiment

Figure 11:
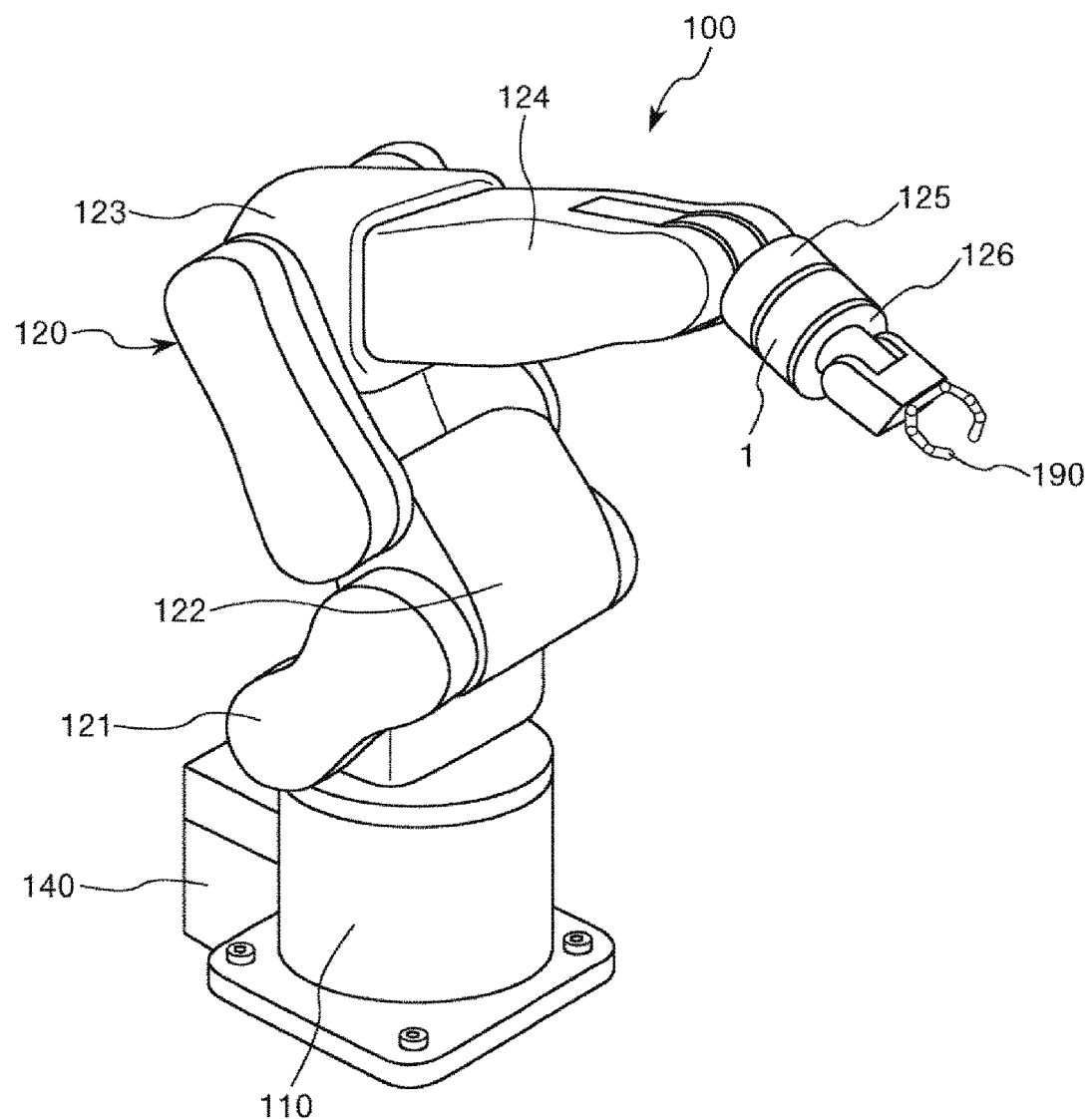
FIG. 11 is a perspective view showing a robot according to a fifth embodiment of the invention.
Figure 12:
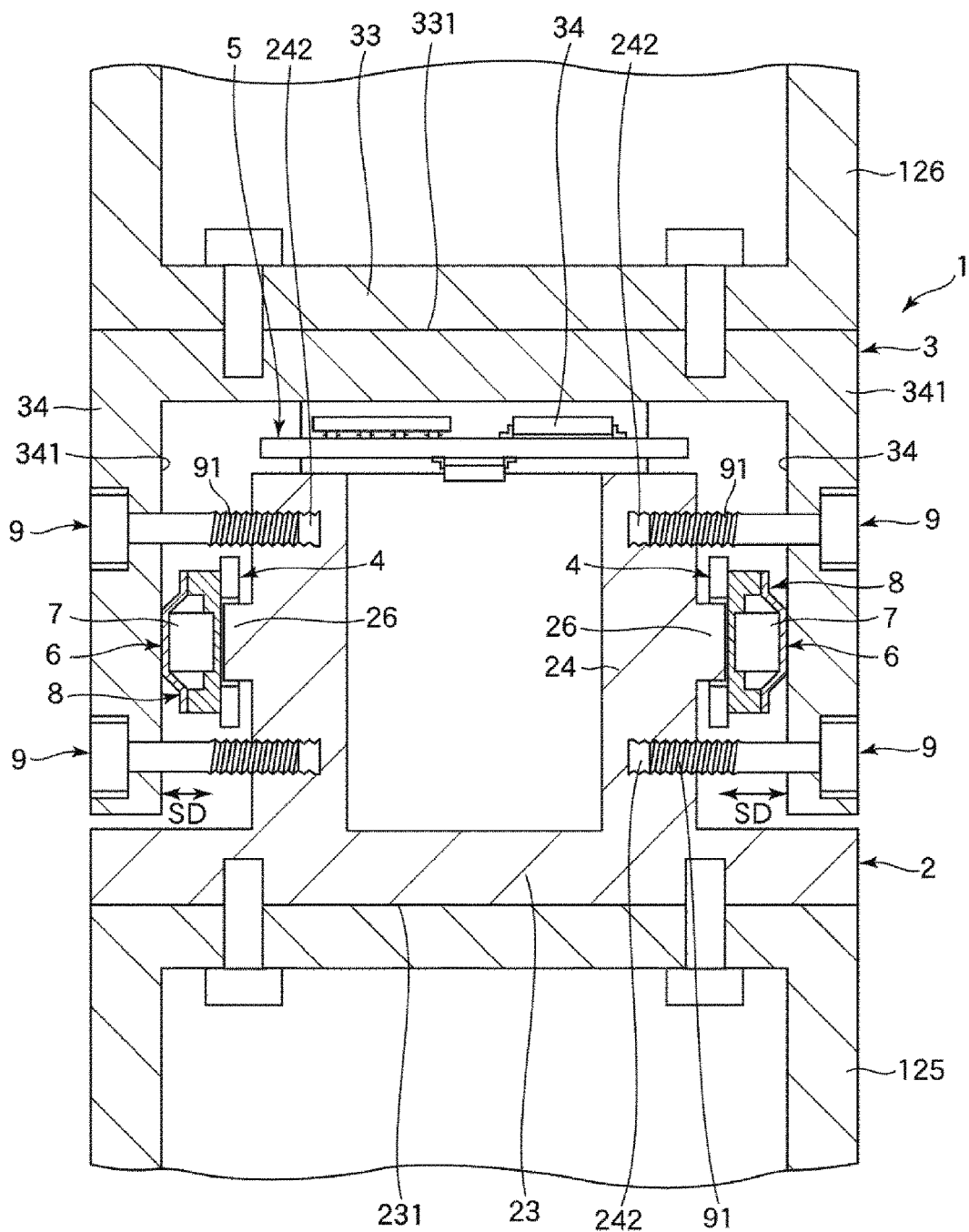
FIG. 12 is a partially enlarged sectional view of the robot shown in FIG. 11.

FIG. 11 is a perspective view showing a robot according to the fifth embodiment of the invention. FIG. 12 is a partially enlarged sectional view of the robot shown in FIG. 11.

A robot 100 shown in FIG. 11 is e.g. a robot that may be used in a manufacturing process in which industrial products including precision apparatuses are manufactured. As shown in the drawing, the robot 100 has a base 110 as a base part fixed to e.g. a floor or ceiling, an arm 120 rotatable with respect to the base 110, an end effector 190 (hand) provided on the distal end of the arm 120, and a robot control unit 140 that controls driving of the arm 120 and the end effector 190.

Further, the arm 120 has a first arm 121 rotatably coupled to the base 110, a second arm 122 rotatably coupled to the first arm 121, a third arm 123 rotatably coupled to the second arm 122, a fourth arm 124 rotatably coupled to the third arm 123, a fifth arm 125 rotatably coupled to the fourth arm 124, and a sixth arm 126 rotatably coupled to the fifth arm 125. Further, a hand connecting part is provided in the sixth arm 126, and the end effector 190 is attached to the hand connecting part.

In the robot 100, the above described force detection apparatus 1 is provided as a sensor that detects an external force applied to the end effector 190. As the force detection apparatus 1, e.g. one of the apparatuses of the above described first to fourth embodiments may be used. Note that, in the embodiment, the force detection apparatus 1 of the above described first embodiment is used.

Specifically, as shown in FIG. 12, the force detection apparatus 1 is fixed to the arm 120 so that the first base part 2 may be located on the proximal end side of the arm 120 and the second base part 3 may be located on the distal end side of the arm 120. In the embodiment, the force detection apparatus 1 is located between the fifth arm 125 and the sixth arm 126, the first base part 2 is connected (fixed) to the fifth arm 125 and the second base part 3 is connected (fixed) to the sixth arm 126.

Note that the placement of the force detection apparatus 1 is not particularly limited. For example, the force detection apparatus 1 may be located between the sixth arm 126 and the end effector 190. Or, the force detection apparatus 1 may be placed so that the first base part 2 may be located on the distal end side of the arm 120 and the second base part 3 may be located on the proximal end side of the arm 120.

The force detected by the force detection apparatus 1 is fed back to the control unit 140, and thereby, the robot 100 may execute more precise work. Further, the robot 100 may sense contact of the end effector 190 with a work object or obstacle or the like by the force detected by the force detection apparatus 1. Accordingly, actions including grasping and moving of the work object by the end effector 190 may be performed more precisely, an obstacle avoidance action, object damage avoidance action, etc. that have been difficult in the position control of related art may be easily performed, and the robot 100 may execute work more precisely and safely.

As described above, the robot 100 has the force detection apparatus 1. Accordingly, the robot may enjoy the advantages of the above described force detection apparatus 1 and may exert better reliability and detection characteristics. Further, downsizing of the whole robot 100 may be realized.

Particularly, the force detection apparatus 1 has the width W suppressed to be smaller than that of the configuration of related art, and, as shown in FIG. 12, the projection of the force detection apparatus 1 from the fifth arm 125 and the sixth arm 126 may be suppressed. Accordingly, the robot 100 is harder to come into contact with surroundings. The smaller the robot 100, the more remarkable the effect. Further, for example, the height of the force detection apparatus 1 tends to become larger compared to that of the configuration of related art because the two precompression bolts 9 are arranged along the center axis J1 (height direction). Accordingly, for example, the separation distance between the end effector 190 and the fifth arm 125 is larger, and the moment applied to the fifth arm 125 is larger by the distance when an object is grasped by the end effector 190. Thus, for example, when a torque sensor is provided in the joint part of the fifth arm 125, the moment applied to the fifth arm 125 may be accurately detected by the torque sensor.

Note that the configuration of the robot 100 is not particularly limited, but, for example, the number of arms may be different from that of the embodiment.

Sixth Embodiment

Figure 13:
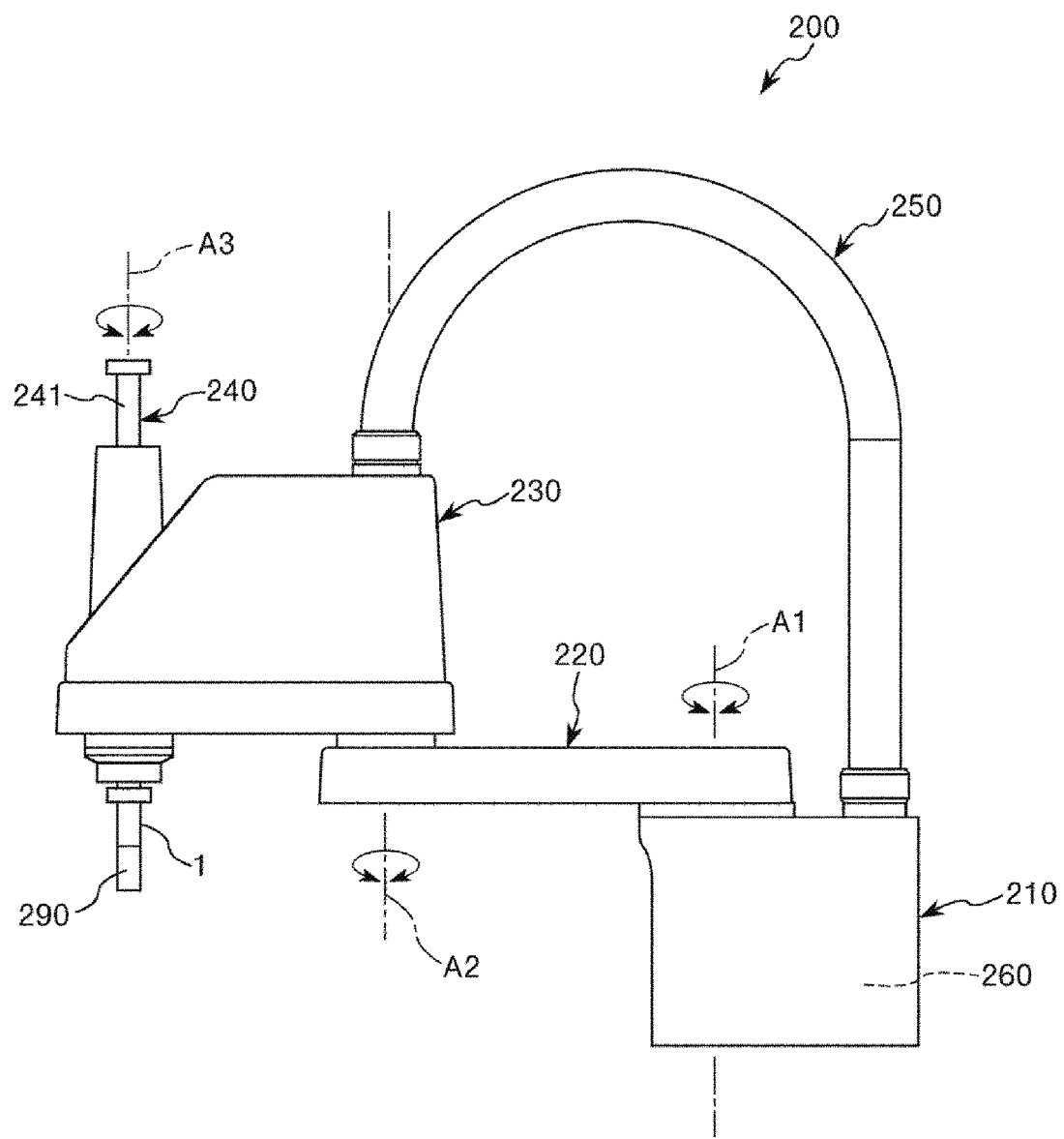
FIG. 13 is a side view showing a robot according to a sixth embodiment of the invention.
Figure 14:
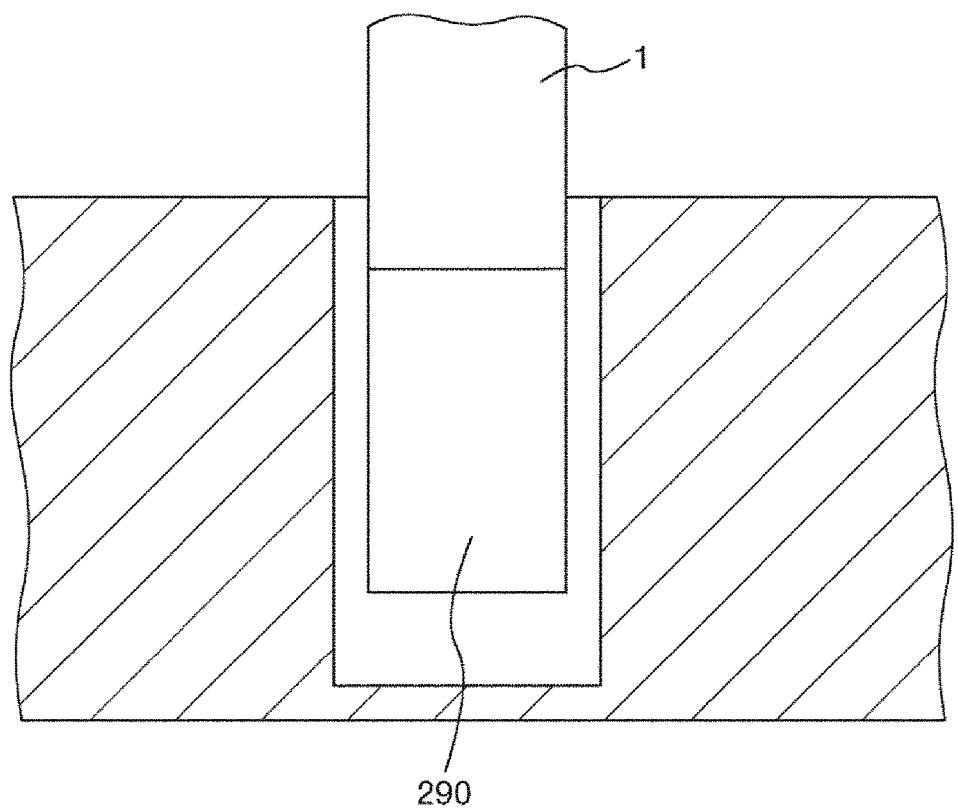
FIG. 14 is a sectional view showing a working state of the robot shown in FIG. 13.

FIG. 13 is a side view showing a robot according to the sixth embodiment of the invention. FIG. 14 is a sectional view showing a working state of the robot shown in FIG. 13.

A robot 200 shown in FIG. 13 is the so-called horizontal articulated robot (scalar robot), and used in e.g. a manufacturing process of manufacturing precision apparatuses etc. and may perform grasping, carrying, etc. of precision apparatuses and components. The robot 200 has a base 210, a first arm 220, a second arm 230, a working head 240, a wire routing part 250, and a robot control unit 260.

The base 210 is fixed by bolts or the like to a floor surface (not shown), for example. The first arm 220 is coupled to the upper end portion of the base 210. The first arm 220 is rotatable about an axis A1 along the vertical direction with respect to the base 210. Further, the second arm 230 is coupled to the distal end portion of the first arm 220. The second arm 230 is rotatable about an axis A2 along the vertical direction with respect to the first arm 220.

The working head 240 is placed in the distal end portion of the second arm 230. The working head 240 has a spline shaft 241 inserted through a spline nut and a ball screw nut (both not shown) coaxially provided in the distal end portion of the second arm 230. The spline shaft 241 is rotatable with respect to the second arm 230 about an axis A3 along the vertical direction and movable in the upward and downward directions (can rise and fall). An end effector 290 (hand) is coupled to the distal end portion of the spline shaft 241.

In the robot 200, the above described force detection apparatus 1 is provided as a sensor that detects an external force applied to the end effector 290. As the force detection apparatus 1, e.g. one of the apparatuses of the above described first to fourth embodiments may be used. Note that, in the embodiment, the force detection apparatus 1 of the above described first embodiment is used.

Specifically, the force detection apparatus 1 is provided between the spline shaft 241 and the end effector 290. Further, the force detection apparatus 1 is fixed so that the first base part 2 may be located on the spline shaft 241 side and the second base part 3 may be located on the end effector 290 side. Note that the placement of the force detection apparatus 1 is not particularly limited. For example, the force detection apparatus 1 may be placed so that the first base part 2 may be located on the end effector 290 side and the second base part 3 may be located on the spline shaft 241 side.

As described above, the robot 200 has the force detection apparatus 1. Accordingly, the robot may enjoy the advantages of the above described force detection apparatus and may exert better reliability and detection characteristics. Further, downsizing of the whole robot 200 may be realized.

Particularly, the force detection apparatus 1 has the width W suppressed to be smaller than that of the configuration of related art, and, as shown in FIG. 13, the projection of the force detection apparatus 1 from the spline shaft 241 and the end effector 290 may be suppressed. Accordingly, for example, as shown in FIG. 14, the force detection apparatus 1 may enter a narrower hole with the end effector 290, and reduction of workability of the robot 200 by the force detection apparatus 1 may be suppressed.

As above, the force detection apparatus and the robot according to the invention are explained based on the illustrated embodiments, however, the invention is not limited to those. The configurations of the respective parts may be replaced by arbitrary configurations having the same functions. Further, other arbitrary configurations may be added to the invention. Furthermore, the respective embodiments may be appropriately combined.

The entire disclosure of Japanese Patent Application No. 2017-089385, filed Apr. 28, 2017 is expressly incorporated by reference herein.

What is claimed is:

1. A force detection apparatus comprising:
a base having a first axis and an outer circumference around the first axis;
a plurality of piezoelectric sensor devices disposed at position directly adjacent to the outer circumference of the base; and
two fastening members disposed in the outer circumference of the base, the two fastening members being configured to apply precompression to a corresponding one of the plurality of piezoelectric sensor devices,
wherein the two fastening members sandwich the corresponding one of the plurality of piezoelectric sensor devices, and
the two fastening members and the corresponding one of the plurality of piezoelectric sensor devices are aligned with each other parallel to the first axis.

2. The force detection apparatus according to claim 1, wherein the of the plurality of piezoelectric sensor devices include four of the piezoelectric sensor devices that are provided at positions directly adjacent to the outer circumference of the base.

3. The force detection apparatus according to claim 1, wherein each of the plurality of piezoelectric sensor devices has a plurality of piezoelectric substrates.

4. The force detection apparatus according to claim 3, wherein the plurality of piezoelectric substrates are stacked in a direction crossing the first axis.

5. The force detection apparatus according to claim 3, wherein the plurality of piezoelectric substrates include a Y cut quartz crystal plate.

6. A force detection apparatus comprising:
a plurality of piezoelectric sensor devices placed around a first axis; and
two fastening members provided in correspondence with the plurality of piezoelectric sensor devices and applying precompression to a corresponding one of the plurality of piezoelectric sensor devices,
wherein the two fastening members are placed so that the corresponding one of the plurality of piezoelectric sensor devices is located between the two fastening members, and
the two fastening members and the corresponding one of the plurality of piezoelectric sensor devices are aligned with each other along a third axis respectively tilted relative to the first axis and a second axis orthogonal to the first axis.

7. The force detection apparatus according to claim 6, wherein the plurality of piezoelectric sensor devices include four of the piezoelectric sensor devices that are provided around the first axis.

8. The force detection apparatus according to claim 6, wherein each of the plurality of piezoelectric sensor devices has a plurality of piezoelectric substrates.

9. The force detection apparatus according to claim 8, wherein the plurality of piezoelectric substrates are stacked in a direction crossing the first axis.

10. The force detection apparatus according to claim 8, wherein the plurality of piezoelectric substrates include a Y cut quartz crystal plate.

11. A robot comprising:
a body;
an arm attached to the body;
an end effector attached at a distal end of the arm;
a force detection apparatus disposed at the end effector, the force detection apparatus including:
a base having a first axis and an outer circumference around the first axis;
a plurality of piezoelectric sensor devices disposed at position directly adjacent to the outer circumference of the base; and
two fastening members disposed in the outer circumference of the base, the two fastening members being configured to apply precompression to a corresponding one of the plurality of piezoelectric sensor devices,
wherein the two fastening members sandwich the corresponding one of the plurality of piezoelectric sensor devices, and
the two fastening members and the corresponding one of the plurality of piezoelectric sensor devices are aligned with each other parallel to the first axis.

* * * * *